United States Patent [19]

Chinn

[11] 3,883,582

[45] May 13, 1975

[54] 2-ETHYNYL-2-HYDROXY-5-(6-METHOXY-2-NAPHTHYL)-ALPHA, ALPHA-DIMETHYLCYCLOPENTANEE-THANOL AND ESTERS

[75] Inventor: Leland J. Chinn, Morton Grove, Ill.

[73] Assignee: G. D. Searle & Co., Chicago, Ill.

[22] Filed: Apr. 30, 1973

[21] Appl. No.: 355,777

[52] U.S. Cl..... 260/488 CD; 260/410.5; 260/473 F; 260/520; 260/613 R; 424/311; 424/312; 424/341

[51] Int. Cl.................. C07c 69/14; C07c 69/24

[58] Field of Search ....... 260/488 CD, 613 R, 410.5

[56] References Cited

FOREIGN PATENTS OR APPLICATIONS 6,702,807  9/1967  South Africa ............... 260/488 CD Primary Examiner—Vivian Garner
Attorney, Agent, or Firm—John M. Brown

[57] ABSTRACT

Preparation and the valuable biological properties — including estrogenic and antiinflammatory activity — of 2-ethynyl-2-hydroxy-5-(6-methoxy-2-naphthyl-$\alpha$, $\alpha$-dimethyl-cyclopentaneethanol and esters thereof are disclosed.

3 Claims, No Drawings

2-ETHYNYL-2-HYDROXY-5-(6-METHOXY-2-NAPHTHYL)-ALPHA, ALPHA-DIMETHYLCYCLOPENTANEETHANOL AND ESTERS

This invention relates to 2-ethynyl-2-hydroxy-5-(6-methoxy-2-napthyl)-α,α-dimethylcyclopentaneethanol and esters, and to processes for the preparation thereof. More particularly, this invention relates to new, useful, and unobvious chemical compounds of the formula

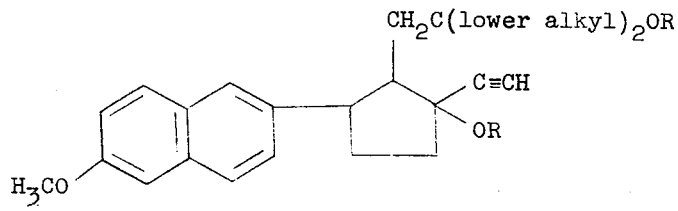

wherein R represents hydrogen or lower alkanoyl.

The lower alkyls called for in the formula are methyl, ethyl, propyl, isopropyl, butyl, isobutyl, sec.-butyl, tert.-butyl, pentyl, neopentyl, hexyl, isohexyl, heptyl, or like monovalent, saturated, acyclic, straight-or branched-chain, hydrocarbon groupings of the formula $$-C_nH_{2n+1}$$

wherein $n$ represents a positive integer less than 8. By "lower alkanoyl" is meant a radical of the formula

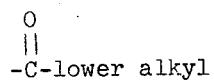

wherein the lower alkyl constituent is defined as before.

The compounds to which this invention relates are useful by reason of their valuable biological properties. They are both estrogenic and antiinflammatory.

The estrogenic utility of the instant compounds is evident from the results of a standardized test for their capacity to increase uterine weight in immature mice. The procedure is substantially the same as that described by Edgren, Proc. Soc. Exper. Biol. Med., 92, 569 (1956). White, female, 21-day-old mice maintained on a synthetic estrogen-free diet are used as test animals. To each of a group of 9–10 such animals, a suspension of test compound in 0.3 ml. of corn oil is subcutaneously administered in equal doses on each of 3 successive days. A second group of 9–10 animals likewise and concurrently administered corn oil alone serves as controls. The day after treatment is concluded, the animals are sacrificed; and the uteri are excised, dissected free of extraneous tissue, blotted to express contained fluid, and individually weighed. A compound is considered active if the uterine weights of the animals treated therewith significantly ($P \leq 0.01$) exceed the uterine weights of the controls. The products of Examples 1B and 2 hereinafter were active in this test at total doses of 4 and 1 mg., respectively. A compound which is structurally distinguished from the product of Example 1B by the absence of the α,α-dimethyl substituents and the presence of a 1-methyl substituent [viz., 2-ethynyl-2-hydroxy-5-(6-methoxy-2-naphthyl)-1-methylcyclopentaneethanol] is likewise biologically distinguished in that it was inactive in this test at a total dose of 4 mg.

The antiinflammatory utility of the instant compounds is evident from the results of a test, similar to that described by Pearson et al. in Arthritis Rheumat., 2, 440 (1959), which measures the capacity to inhibit the edema induced in rats by injection of *Mycobacterium butyricum*. The products of Examples 1B and 2 hereinafter were active in this test at a dose of 1 mg. administered intragastrically.

Those skilled in the art will recognize that observations of activity in standardized tests for particular biological effects are fundamental to the development of valuable new drugs, both veterinary and human.

Preparation of the compounds of this invention proceeds by contacting 2-ethynyl-2-hydroxy-5-(6-methoxy-2-naphthyl)cyclopentaneacetic acid [J. Org. Chem., 27, 1733 (1962)] with diazomethane in cold ethyl ether. The resultant methyl ester is heated in boiling ethyl ether with (lower alkyl)magnesium bromide to give the diol, and the diol is esterified by heating with a lower alkanoic acid anhydride in pyridine.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. Methyl 2-ethynyl-2-hydroxy-5-(6-methoxy-2-naphthyl)cyclopentaneacetate.

To a solution of 1 part of 2-ethynyl-2-hydroxy-5-(6-methoxy-2-naphthyl)cyclopen-taneacetic acid in 12 parts of ethyl ether at 5° is added ethereal diazomethane prepared from 4 parts of N-nitroso-methylurea according to Org. Syn., Coll. Vol. 2, p. 165 (1943). The resultant mixture is allowed to stand at 5° for 3 hours, then stripped of solvent by vacuum distillation. The residual viscous oil is crystallized from a mixture of ethyl ether and pentane to give methyl 2-ethynyl-2-hydroxy-5-(6-methoxy-2-naphthyl)cyclopentane-acetate melting in the range 102.5°–110°.

B. 2-Ethynyl-2-hydroxy-5-(6-methoxy-2-naphthyl)-α,α-dimethylcyclopentaneethanol.

To 30 parts of methyl-magnesium bromide in 475 parts of ethyl ether at the boiling point under reflux is added, with stirring, a solution of 10 parts of methyl 2-ethynyl-2-hydroxy-5-(6-methoxy-2-naphthyl)cyclopentaneacetate in 475 parts of ethyl ether. Stirring and heating at the boiling point under reflux is continued for 7 hours, whereupon the reaction mixture is cooled to room temperature and then diluted with 1200 parts of a saturated aqueous solution of ammonium chloride.

The ethereal phase is separated, washed with water, dried over anhydrous sodium sulfate, and stripped of solvent by vacuum distillation. The residual viscous oil is crystallized from ethyl ether to give 2-ethynyl-2-hydroxy-5-(6-methoxy-2-naphthyl)-α,α-dimethylcyclopentaneethanol melting at approximately 167.5°–168°.

EXAMPLE 2

2-Ethynyl-2-hydroxy-5-(6-methoxy-2-naphthyl)-α,α-dimethylcyclopentaneethanol diacetate.

A solution of 88 parts of 2-ethynyl-2-hydroxy-5-(6-methoxy-2-naphthyl-α,α-dimethylcyclopentaneethanol in a mixture of 1000 parts of pyridine with 1000 parts of acetic anhydride is maintained at 95° under nitrogen for 48 hours, then diluted with 20,000 parts of ice water. The resultant mixture is extracted with ether. The ether extract is washed with water, dried over anhydrous sodium sulfate, and stripped of solvent by vacuum distillation. The residue is crystallized from a mixture of ethyl ether and hexane to give 2-ethynyl-2-hydroxy-5-(6-methoxy-2-naphthyl)-α,α-dimethylcyclopentaneethanol diacetate melting at approximately 122°–123°.

EXAMPLE 3

2-Ethynyl-2-hydroxy-5-(6-methoxy-2-naphthyl)-α,α-dimethylcyclopentaneethanol dipropionate.

Substitution of 1000 parts of propionic anhydride for the acetic anhydride called for in Example 2 affords, by the procedure there detailed, 2-ethynyl-2-hydroxy-5-(6-methoxy-2-naphthyl)-α,α-dimethylcyclopentaneethanol dipropionate.

What is claimed is:
1. A compound of the formula

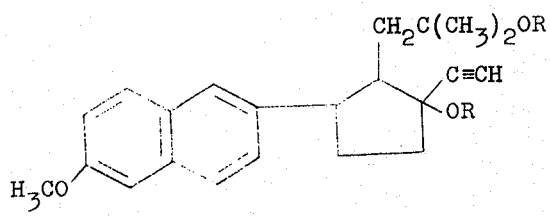

wherein R represents lower alkanoyl.

2. A compound according to claim 1 which is 2-ethynyl-2-hydroxy-5-(6-methoxy-2-naphthyl)-α,α-dimethyl-cyclopentaneethanol diacetate.

3. A compound according to claim 1 which is 2-ethynyl-2-hydroxy-5-(6-methoxy-2-naphthyl)-α,α-dimethyl-cyclopentaneethanol dipropionate.

* * * * *